US 6,677,904 B2

(12) United States Patent
Lichtfuss

(10) Patent No.: US 6,677,904 B2
(45) Date of Patent: Jan. 13, 2004

(54) INTEGRATED WIRELESS ANTENNA FOR AN IMAGE CAPTURING DEVICE

(75) Inventor: Hans A. Lichtfuss, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 10/062,886

(22) Filed: Jan. 31, 2002

(65) Prior Publication Data

US 2003/0142032 A1 Jul. 31, 2003

(51) Int. Cl.[7] .................................................. H01Q 1/24
(52) U.S. Cl. .................... 343/702; 343/911 R; 358/335; 455/556; 348/375; 396/56
(58) Field of Search ......................... 343/911 R, 911 L, 343/873, 702; 358/224, 335; 455/90, 556; 348/148, 149, 211, 375; 396/56, 57, 281; H01Q 1/24

(56) References Cited

U.S. PATENT DOCUMENTS

| | | | |
|---|---|---|---|
| 4,873,576 A | 10/1989 | Hattori et al. ............... 358/224 |
| 5,296,884 A | 3/1994 | Honda et al. ................ 354/106 |
| 5,666,159 A | 9/1997 | Parulski et al. ............. 348/211 |
| 5,712,679 A | 1/1998 | Coles .......................... 348/158 |
| 5,844,604 A | * 12/1998 | Myeong ..................... 348/373 |
| 5,893,037 A | 4/1999 | Reele .......................... 455/556 |
| 5,913,078 A | 6/1999 | Kimura et al. ................ 396/50 |
| 6,122,526 A | 9/2000 | Parulski et al. ............. 455/556 |
| 6,259,475 B1 * | 7/2001 | Ramachandran et al. ... 348/148 |
| 6,281,853 B1 * | 8/2001 | Caille et al. ................. 343/754 |
| 6,308,084 B1 | 10/2001 | Lonka ......................... 455/556 |
| 2003/0112345 A1 * | 6/2003 | Yamaguchi et al. ..... 348/231.6 |

FOREIGN PATENT DOCUMENTS

| JP | 51976 A | * 2/2003 | .......... H04N/5/225 |
|---|---|---|---|
| WO | WO 96/31051 | 10/1996 | .......... H04N/5/232 |

* cited by examiner

*Primary Examiner*—Tho Phan

(57) ABSTRACT

An image capturing device includes a body, a lens apparatus extending from the body, and an antenna formed as part of the lens apparatus. The lens apparatus may be fixed with respect to the body, or may retract at least partially into the body.

24 Claims, 3 Drawing Sheets

INTEGRATED WIRELESS ANTENNA FOR AN IMAGE CAPTURING DEVICE

FIELD OF THE INVENTION

The present invention relates generally to an image capturing device, and more particularly to an integrated wireless antenna for an image capturing device.

BACKGROUND OF THE INVENTION

Antennas may be used for image capturing devices when the user wants to perform some manner of input or output operation. This may include operations such as transferring images or portions of images, transferring groups of images, transferring other data such as camera settings, transferring information corresponding to transferred images, etc. In addition, an antenna may be useful if the user wants to update an internal firmware or load a new software application into the image capturing device. The image capturing device may therefore need to transmit and receive digital data.

A first prior art antenna is an antenna extending from the device, similar to a cell phone antenna. This prior art approach offers good isolation from electrical components, as the antenna is positioned away from internal electrical circuitry.

However, this first prior art approach has several drawbacks. The antenna may be cumbersome and in the way. The antenna is therefore prone to damage and/or breakage. The antenna impacts the industrial design of the camera, and may get in the way of the user's hands during use. Furthermore, this prior art approach may require the user to perform an additional step of extending the antenna, complicating usage.

A second prior art antenna is an internal antenna constructed within the image capturing device. This may include an antenna formed into the case or formed within an internal volume of the device.

The second prior art approach also has drawbacks. The antenna in this prior art approach is positioned relatively close to the internal electrical circuitry and therefore may suffer from interference. In addition, the antenna may induce noise in the circuitry. Moreover, modern cameras are very compact and as such an interior antenna takes up internal volume. Furthermore, an internal antenna may require a lot of shielding, which increases the complexity and the cost of the image capturing device.

A third prior art approach is an antenna mounted on a card that may be inserted into a memory card slot of a camera. This enables a user to add a wireless capability to an existing camera and does not impact the original design of the device. Moreover, this prior art approach offers good isolation from electrical components, as the antenna is positioned away from the internal circuitry.

The third prior art approach also has drawbacks. The antenna may extend outside the camera body in order to achieve satisfactory performance and therefore may get in the way of the user's hands. Moreover, the antenna may be subject to damage and/or breakage. If the camera has a card slot door, the door must remain open during use, which is awkward and increases the possibility that the card slot door may be damaged or broken. Furthermore, a card slot antenna may allow foreign objects, debris, moisture, etc., to get into the image capturing device.

Therefore, there remains a need in the art for improvements in image capturing devices.

SUMMARY OF THE INVENTION

An image capturing device comprises a body, a lens apparatus extending from the body, and an antenna formed as part of the lens apparatus. The lens apparatus may be fixed with respect to the body, or may retract at least partially into the body.

DETAILED DESCRIPTION

Figure 1:
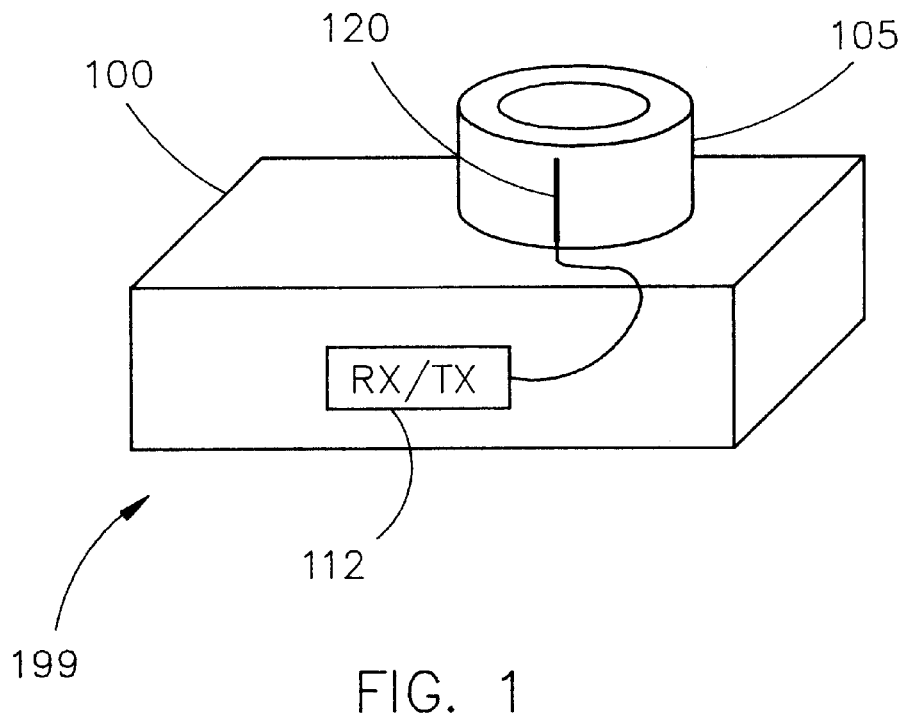
FIG. 1 shows an image capturing device, including a body, a lens apparatus, a transceiver, and an antenna electrically communicating with the transceiver.

FIG. 1 shows an image capturing device 199, including a body 100, a lens apparatus 105, a transceiver 112, and an integrated antenna 120 electrically communicating with the transceiver 112.

The image capturing device 199 may be formed by forming a body 100, forming a lens apparatus 105 extending from the body 100, and forming an antenna 120 as part of the lens apparatus 105. The antenna 120 may be formed on an exterior surface of the lens apparatus 105, may be formed into a wall of the lens apparatus 105, or may be formed on an interior surface of the lens apparatus 105. Although the lens apparatus 105 extends from the body 100, it should be understood that the lens apparatus 105 may be at least partially retractable into the body 100.

The lens apparatus 105 may be a fixed lens apparatus or movable lens apparatus. For example, the lens apparatus 105 may be a zoom lens or a retractable lens that retracts at least partially into the body 100 when not in an image capturing mode. The lens apparatus 100 may be substantially barrel shaped, as shown, but alternatively may be other shapes if desired.

The transceiver 112 may be any type of receiver, transmitter, or combination of receiver and transmitter. The transceiver 112 may transmit and/or receive radio frequency waves according to any known modulation scheme, communications protocol, etc. For example, the transceiver 112 may communicate using the BLUETOOTH wireless communication protocol.

In the embodiment shown, the antenna 120 is a simple line antenna. The antenna 120 may be formed of any suitable material, and may be formed as part of the lens apparatus 105. This may include forming the antenna 120 on an exterior surface of the lens apparatus 105, forming the antenna 120 into a wall of the lens apparatus 105, or forming the antenna 120 on an interior surface of the lens apparatus 105.

It should be noted that additionally the antenna 120 may be incorporated into a flexible film that may be adhered to any portion of the lens apparatus 105. Therefore, the antenna 120 may conform to the contour of the lens apparatus 105. The antenna 120 may be adhered to the lens apparatus 105, or may even be retained on the lens apparatus 105 by a static electrical attraction. In addition, the flexible film antenna 120 may be mostly transparent and may include symbols and lettering. Therefore, the flexible film antenna 120 may even be located on the lens of the lens apparatus 105, such as in the form of a label (see FIG. 4 and accompanying discussion).

In the movable lens embodiment, when the lens apparatus 105 is extended the antenna 120 is automatically extended and therefore is external to the body 100 of the image capturing device 199. Conversely, the antenna 120 may be at least partially internally located when the lens apparatus 105 is not extended. The antenna 120 may be automatically extended when the image capturing device 199 is placed in an image capturing mode, when the image capturing device 199 is powered on, or when the image capturing device 199 is placed in some manner of communication mode.

Figure 2:
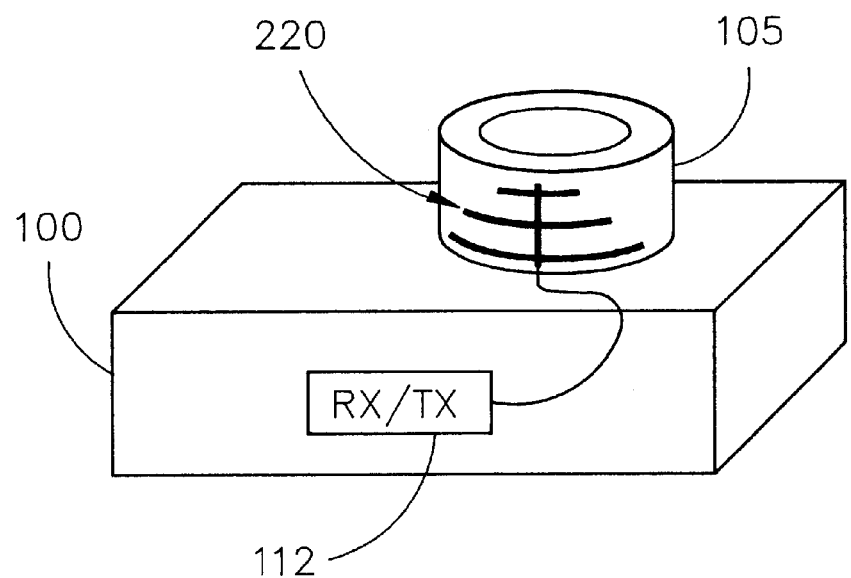
FIG. 2 shows an antenna according to another embodiment of the invention.

FIG. 2 shows an antenna 220 according to another embodiment of the invention. It should be understood that elements in common between the figures share common reference numerals. The antenna 220 is a directional antenna having a center element and multiple cross elements.

Figure 3:
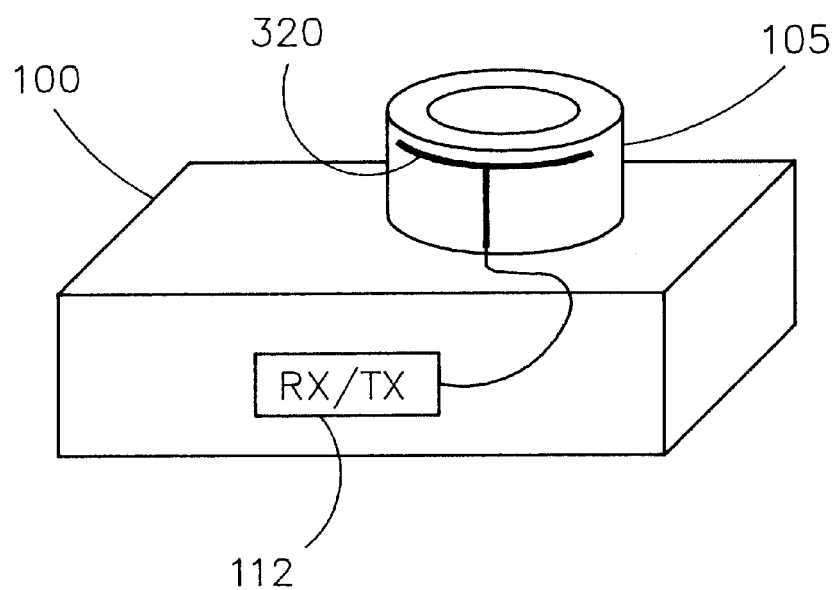
FIG. 3 shows an antenna according to yet another embodiment of the invention.

FIG. 3 shows an antenna 320 according to yet another embodiment of the invention. In this embodiment, the antenna 320 is a dipole formed on the side of the lens apparatus 105.

Figure 4:
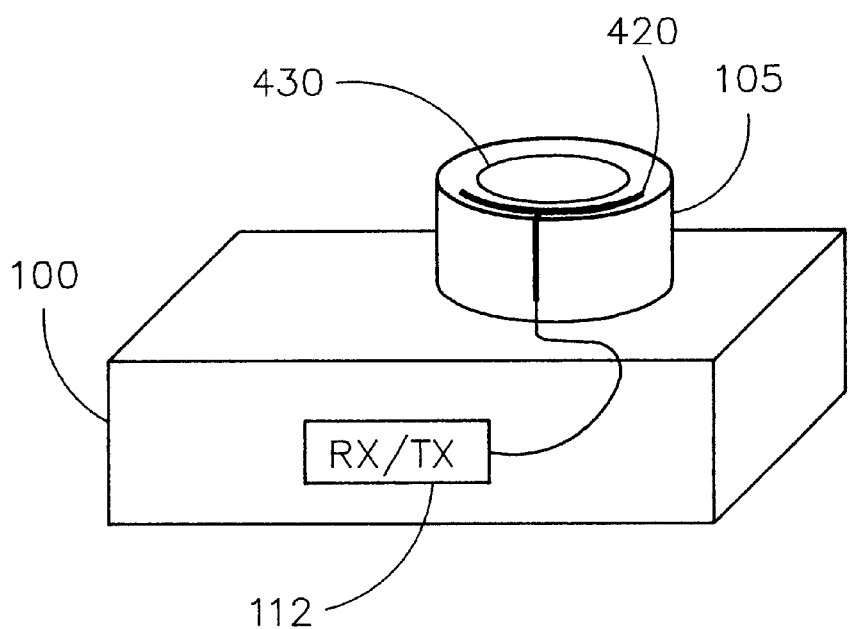
FIG. 4 shows an antenna according to yet another embodiment of the invention.

FIG. 4 shows an antenna 420 according to yet another embodiment of the invention. The antenna 420 is again a dipole element, but with at least a portion of the antenna 420 positioned on the end of the lens apparatus 105. Furthermore, a portion of the antenna 420 may even be positioned on the lens 430. For example, the antenna 420 may be formed as part of a substantially transparent sticker or label positioned on the lens 430, as previously discussed.

Figure 5:
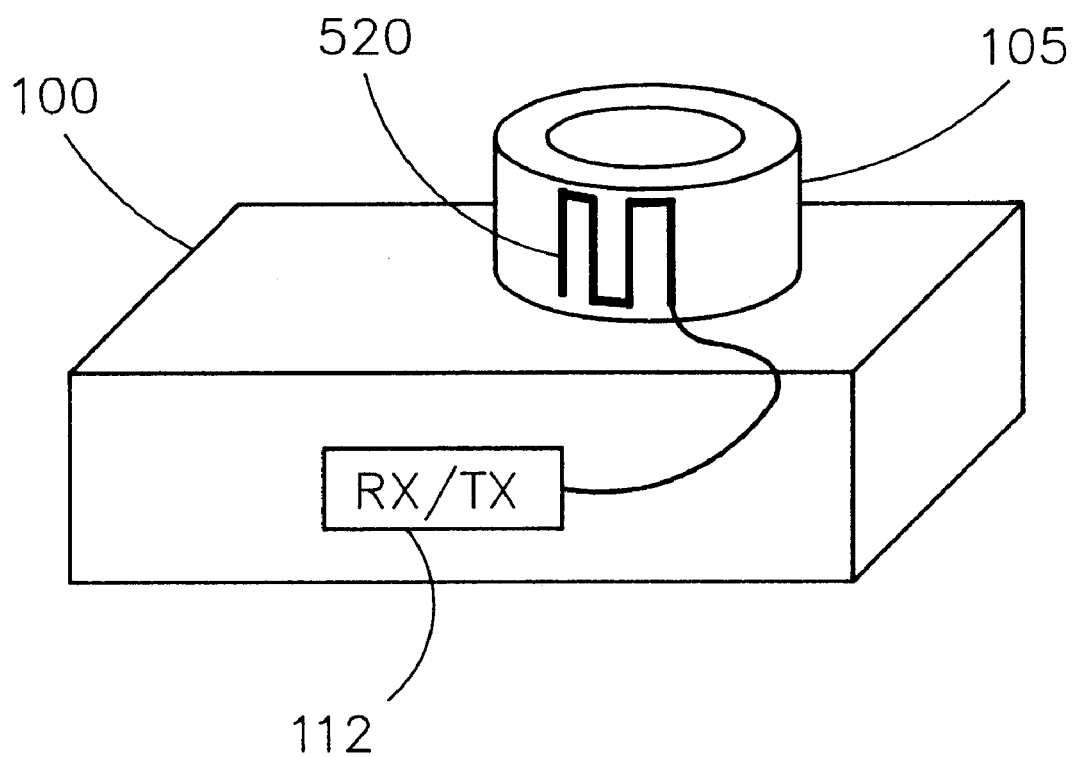
FIG. 5 shows an antenna according to yet another embodiment of the invention.

FIG. 5 shows an antenna 520 according to yet another embodiment of the invention. The antenna 520 is a compact element that includes one or more repeating portions that traverse at least a portion of the lens apparatus 105. It should be understood that the repeating portions may be constructed according to other patterns, such as a spiral pattern formed at least partially around the circumference of the lens apparatus 105.

The wireless antenna according to the invention may be employed on any image capturing device that includes a fixed or movable lens apparatus. The wireless antenna may be employed by digital and analog still cameras. In addition, the wireless antenna may be employed by video cameras that include a fixed or movable lens apparatus.

The wireless antenna according to the invention provides several benefits. The antenna is cleanly integrated into the industrial design of the image capturing device and does not require changes of the exterior and/or design of the image capturing device. The antenna is automatically extended when the lens apparatus is extended and the user does not need to perform any action. The antenna is relatively remote from the internal electronic circuitry and therefore does not receive or cause substantial electromagnetic noise in the image capturing device. The antenna enables greater antenna design flexibility while orienting the antenna radiation lobes away from the internal electronic circuitry. This reduces shielding needs and reduces complexity of the image capturing device. The antenna does not independently project from the body of the image capturing device and therefore is unlikely to be damaged or broken.

We claim:

1. An image capturing device, comprising:
   a body;
   a lens apparatus extending from said body; and
   an antenna formed as part of said lens apparatus.

2. The device of claim 1, wherein said antenna is formed on an exterior surface of said lens apparatus.

3. The device of claim 1, wherein said antenna is formed into a wall of said lens apparatus.

4. The device of claim 1, wherein said antenna is formed on an interior surface of said lens apparatus.

5. The device of claim 1, wherein said lens apparatus is fixed with respect to said body.

6. The device of claim 1, wherein said lens apparatus retracts at least partially into said body.

7. The device of claim 1, wherein said antenna is formed into a substantially transparent label adhered to said lens apparatus.

8. An image capturing device, comprising:
   a body;
   a lens apparatus extending from said body and being fixed with respect to said body; and
   an antenna formed as part of said lens apparatus.

9. The device of claim 8, wherein said antenna is formed on an exterior surface of said lens apparatus.

10. The device of claim 8, wherein said antenna is formed into a wall of said lens apparatus.

11. The device of claim 8, wherein said antenna is formed on an interior surface of said lens apparatus.

12. The device of claim 8, wherein said antenna is formed into a substantially transparent label adhered to said lens apparatus.

13. An image capturing device, comprising:
    a body;
    a lens apparatus extending from said body and being retractable at least partially into said body; and
    an antenna formed as part of said lens apparatus.

14. The device of claim 13, wherein said antenna is formed on an exterior surface of said lens apparatus.

15. The device of claim 13, wherein said antenna is formed into a wall of said lens apparatus.

16. The device of claim 13, wherein said antenna is formed on an interior surface of said lens apparatus.

17. The device of claim 13, wherein said antenna is formed into a substantially transparent label adhered to said lens apparatus.

18. A method of forming an image capturing device, comprising the steps of:
    forming a body of said image capturing device;
    forming a lens apparatus extending from said body; and
    forming an antenna as part of said lens apparatus.

19. The method of claim 18, with the step of forming said antenna further comprising forming said antenna on an exterior surface of said lens apparatus.

20. The method of claim 18, with the step of forming said antenna further comprising forming said antenna into a wall of said lens apparatus.

21. The method of claim 18, with the step of forming said antenna further comprising forming said antenna on an interior surface of said lens apparatus.

22. The method of claim 18, wherein said lens apparatus is fixed with respect to said body.

23. The method of claim 18, wherein said lens apparatus is retractable at least partially into said body.

24. The method of claim 18, wherein the step of forming said antenna further comprises forming said antenna into a substantially transparent label that adheres to said lens apparatus.

* * * * *